E. G. VAN ZANDT.
GAS BURNER.
APPLICATION FILED DEC. 14, 1909. RENEWED APR. 19, 1912.

1,045,468.

Patented Nov. 26, 1912.

2 SHEETS—SHEET 1.

E. G. VAN ZANDT.
GAS BURNER.
APPLICATION FILED DEC. 14, 1909. RENEWED APR. 19, 1912.
1,045,468.
Patented Nov. 26, 1912.
2 SHEETS—SHEET 2.
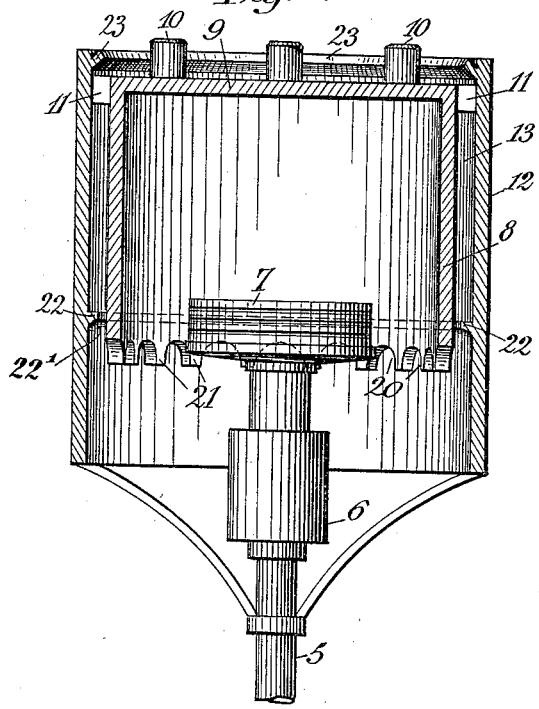

UNITED STATES PATENT OFFICE.

EDWIN G. VAN ZANDT, OF ST. LOUIS, MISSOURI, ASSIGNOR TO VAN ZANDT GAS APPLIANCE COMPANY, OF ST. LOUIS, MISSOURI, A CORPORATION OF MISSOURI.

GAS-BURNER.

1,045,468.  Specification of Letters Patent.  Patented Nov. 26, 1912.

Application filed December 14, 1909, Serial No. 533,052. Renewed April 19, 1912. Serial No. 691,832.

*To all whom it may concern:*

Be it known that I, EDWIN G. VAN ZANDT, a citizen of the United States, and resident of the city of St. Louis and State of Missouri, have invented certain new and useful Improvements in Gas-Burners, of which the following is a specification.

This invention relates to gas-burners and has for its object to provide an improved gas-burner by means of which the gas may be almost entirely burned, and the products of combustion thereof subjected to heat and air treatment in such a manner that any combustible gases therein, or formed thereby, are also completely consumed. The nature of the invention consists in a shell or container over an initial burner, which shell or container has a closed top and gathers the products of combustion of the initial burning. The thus collected products are subjected to the further heat of the initial burner, until the shell or container is filled, when the products of combustion of the initial burner flow out of the bottom of the shell.

The invention consists further in such a shell or container and a cylindrical rim, the rim being spaced apart from the shell and slightly longer than the shell or container.

Figure 1:
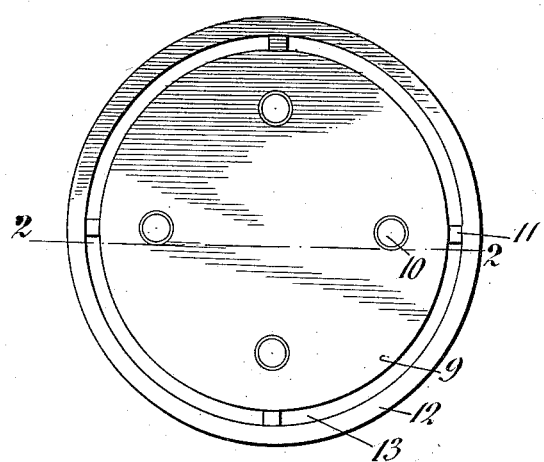
Figure 2:
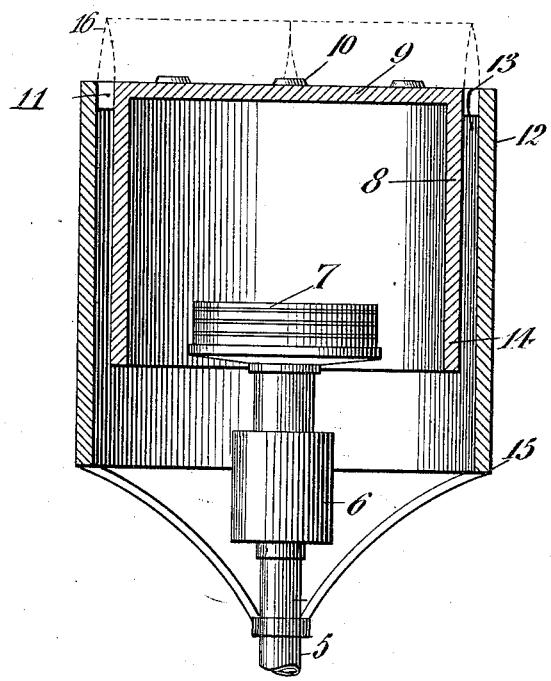

In the accompanying drawing, Figure 1 is a plan view of my improved burner, Fig. 2 is a vertical central section taken on line 2—2 of Fig. 1, and Fig. 3 is a central vertical sectional view showing another embodiment of the invention.

Similar reference characters indicate corresponding parts.

Referring to the drawing, a pipe 5 is connected with a suitable source of gas-supply and with a burner 7, preferably of the Bunsen type with an air and gas mixer 6 as is well known.

A shell or container 8, consisting of a cylindrical cup with part 9 and flanges 14, is placed in inverted position over the initial burner 7 and gathers the products of combustion of the initial burner in the interior thereof. These products of combustion gradually fill the shell or container until, when the same is full, the products flow out of the bottom of the shell or container and in overflowing come in intimate contact with air. Exterior to the shell or container 8 is a wall or outer shell 12, spaced a certain distance away from the shell or container 8, so as to permit the passage of the products of combustion therebetween, suitable struts 11 being provided to secure the rim in place on the shell or container. The outer shell 12 is longer than the flanges 14 of the shell or container 8 and the extended portion acts to prevent the products of combustion from passing into the atmosphere. The overflowing products of combustion pass upwardly through the space 13 thus formed between the shell or container 8 and the rim 11, and being mixed with air and simultaneously heated by the exterior of the heated shell or container, they finally pass out from the space 13 and are ignited at the upper outward edge of the shell or container and upper inner edge of the wall or shell 12 where all the combustible parts thereof are ignited and consumed, and thereby transferred to useful heat.

It is the collecting, heating, spreading, air-mixing, second heating and igniting of the products of combustion, under control, which enable the burner to operate in such a manner that all combustible gases contained in or formed out of the products of combustion of an initial burning of a gas may be utilized and an aggregate heat relatively very high for a given gas-supply obtained.

In Fig. 3 another embodiment of my invention is shown, which consists of a burner having the lower end of the shell or container 8 provided with the inverted U-shaped cut-away portions 20 forming serrations 21. The object of these serrations is to break up the products of combustion flowing out of the shell or container 8 and to spread the same so as to cause as large as possible a surface of the products of combustion to be exposed to the air. The outer shell 12 is provided with an inwardly-extending flange or rib 22 having an inclined surface 22′ placed above the cut-away portions 20, the object of which is to obstruct the flow of gases and deflect them so as to cause them to flow along the outer face of the shell or container 8, and the shell 12 is further provided near its upper end with an inwardly and upwardly projecting flange or rib 23, the object of which is to deflect the combustible gases inwardly above the top of the shell or container 8. In this particular embodiment the supports 10 are a little higher than those shown in Fig. 2 so as to properly support the vessel sufficiently spaced above the flanges 23.

My invention may be used in connection with heaters for heating rooms, and for various other purposes. One of the particular uses for which it is designed is the heating of culinary vessels and utensils, and for this purpose the plate 9 is provided with upwardly projecting lugs 10 which serve to support the vessel or utensil slightly spaced above the plate 9 whereby effective contact of the flame is permitted. The flame indicated by the dotted lines 16 is a thin, light blue, almost transparent flame, and leaves no carbon deposits on the vessel with which it comes in contact, and while it burns in the form shown by the dotted lines after the burner is highly heated, the flame spreads over the entire top of the shell or container. This flame, of a second gas, so to say, aids in imparting heat to the contents of the culinary vessel, and is indicative of an almost perfect combustion of all combustible portions of the products of combustion of an initial burning.

I have shown one embodiment of my invention, but I do not wish to limit myself to the details of the same, since changes may be made therein without departing from the spirit of my invention.

I claim as new:

1. In a gas-burner, an inner shell or container open at the bottom and closed at the top, an initial burner within said shell, and an outer shell, open at the top, spaced from and surrounding said inner shell and extending below the inner shell and terminating substantially at the top of the inner shell.

2. In a gas-burner, an inner shell or container open at the bottom and closed at the top, an initial burner within said shell, and an outer shell surrounding and spaced from the inner shell, and provided with an inwardly extending flange between said shells for retarding the flow of products of combustion therebetween.

3. In a gas-burner, an inner shell or container open at its bottom and closed at its top, an initial burner within said shell, and an outer shell surrounding and spaced from said inner shell and provided near its top with an upwardly and inwardly projecting flange.

4. In a gas-burner having an initial burner, an inner shell or container having a closed top with closed side walls extending downwardly to below the burner, and having an open bottom, said shell being placed over the initial burner and adapted to retain the burning gases from the initial burner about the same whereby the egress of said gases is retarded and the gases caused to burn at the interior of the shell, and an outer shell open at the top and at the bottom and extending downwardly below the lowermost end of the first named shell or container and spaced around the same contiguous thereto so as to form a channel, whereby the gases are guided to the upper part of the inner shell and burned.

5. In a gas-burner, an inner shell or container open at the bottom and closed at the top, an initial burner within said shell, and an outer shell, open at the top and at the bottom, spaced from and surrounding said inner shell and extending below the inner shell and terminating substantially at the top of the inner shell, both of said shells extending below the initial burner.

6. In a gas-burner, the combination of an inner cylindrical shell or container open at the bottom and having a closed top, an initial burner within said inner-shell, and an outer cylindrical shell spaced from and surrounding said inner shell, and extending substantially to the top of and below the bottom of said inner shell.

7. In a gas-burner, the combination of an inner cylindrical shell or container open at the bottom and having a closed top, an initial burner within said inner-shell, an outer cylindrical shell spaced from and surrounding said inner shell, and extending substantially to the top of and below the bottom of said inner shell, and an inwardly projecting flange on the inner face of the outer shell.

8. In a gas-burner, the combination of an inner cylindrical shell or container open at the bottom and having a closed top, an initial burner within said inner-shell, an outer cylindrical shell spaced from and surrounding said inner shell, and extending substantially to the top of and below the bottom of said inner shell, and an inwardly projecting flange at the top of the inner face of the outer shell.

9. In a gas-burner, the combination of a cylindrical shell or container open at the bottom and closed at the top and having serrations at the bottom edge thereof for retarding and dividing the flow of products of combustion from the shell and an initial burner within said shell.

10. In a gas-burner, the combination of an inner cylindrical shell or container open at the bottom and having a closed top, an initial burner within said inner-shell, and an outer cylindrical shell spaced from and surrounding said inner shell, and extending substantially to the top of and below the bottom of said inner shell, said inner shell being serrated at the bottom edge thereof.

11. In a gas-burner, the combination of an inner cylindrical shell or container open at the bottom and having a closed top, an initial burner within said inner-shell, an outer cylindrical shell spaced from and surrounding said inner shell, and extending substantially to the top of and below the bottom of said inner shell, and an inwardly projecting flange at the top of the inner face of the outer shell, said inner shell being serrated at the bottom edge thereof.

In testimony, that I claim the foregoing as my invention, I have signed my name in presence of two subscribing witnesses.

EDWIN G. VAN ZANDT.

Witnesses:
 Jos. B. WIDEN,
 HERRICK J. GRAY.

Copies of this patent may be obtained for five cents each, by addressing the "Commissioner of Patents, Washington, D. C."